United States Patent
Holroyd

(10) Patent No.: US 7,690,668 B2
(45) Date of Patent: Apr. 6, 2010

(54) VEHICLE AXLE MOUNTING

(75) Inventor: James A Holroyd, Stillwater, MN (US)

(73) Assignee: Polaris Industries, Inc., Osceola, WI (US)

( * ) Notice: Subject to any disclaimer, the term of this patent is extended or adjusted under 35 U.S.C. 154(b) by 1219 days.

(21) Appl. No.: 11/085,754

(22) Filed: Mar. 21, 2005

(65) Prior Publication Data

US 2006/0226631 A1    Oct. 12, 2006

(51) Int. Cl.
*B62K 25/02* (2006.01)
*B60B 27/02* (2006.01)

(52) U.S. Cl. .................. 280/285; 280/277; 301/111.01

(58) Field of Classification Search ................. 180/219; 280/277, 285, 286; 301/132, 111.01, 113, 301/120

See application file for complete search history.

(56) References Cited

U.S. PATENT DOCUMENTS

| | | | |
|---|---|---|---|
| 1,545,171 A | | 7/1925 | Schulz |
| 2,226,098 A | * | 12/1940 | Hedstrom ............... 301/111.01 |
| 4,114,918 A | * | 9/1978 | Lutz ............................ 80/284 |
| 4,422,519 A | | 12/1983 | Nomura et al. |
| 4,434,868 A | | 3/1984 | Brenner et al. |
| RE31,989 E | | 9/1985 | Nomura et al. |
| 4,540,062 A | | 9/1985 | Kashiwai |
| 4,540,193 A | | 9/1985 | Noda et al. |
| 4,592,596 A | | 6/1986 | Trautloff |
| 4,634,139 A | | 1/1987 | Watanabe et al. |
| 4,796,719 A | * | 1/1989 | Shiratsuchi .................. 180/219 |
| 4,880,280 A | | 11/1989 | Panzica et al. |
| 4,889,205 A | | 12/1989 | Yoshimi |
| 4,906,053 A | * | 3/1990 | Kawai ...................... 301/110.5 |
| 4,964,287 A | * | 10/1990 | Gaul ........................... 70/233 |
| 5,188,430 A | * | 2/1993 | Chiu ...................... 301/111.01 |
| 5,531,289 A | | 7/1996 | Muramatsu |
| 6,109,635 A | | 8/2000 | Maeda et al. |
| 6,240,648 B1 | | 6/2001 | Dolph |
| 6,315,071 B1 | | 11/2001 | Gogo |
| 6,454,363 B1 | | 9/2002 | Vignocchi et al. |
| 6,675,488 B2 | | 1/2004 | Duke |
| 6,698,811 B1 | * | 3/2004 | Schuchman .................. 296/20 |
| 7,052,422 B2 | * | 5/2006 | Skidmore et al. ........... 474/116 |
| 7,278,693 B2 | * | 10/2007 | Smith et al. .................. 301/113 |
| 7,287,772 B2 | * | 10/2007 | James ......................... 280/288 |
| 2004/0206564 A1 | | 10/2004 | Nagashii et al. |

FOREIGN PATENT DOCUMENTS

| | | |
|---|---|---|
| GB | 191029773 | 4/1911 |
| GB | 2 214 881 A | 9/1989 |
| JP | 63181772 | 2/1990 |

OTHER PUBLICATIONS

International Search Report dated Jun. 30, 2006, Application No. PCT/US2006/009830.

* cited by examiner

*Primary Examiner*—Lesley Morris
*Assistant Examiner*—Marc A Scharich
(74) *Attorney, Agent, or Firm*—Baker & Daniels LLP

(57) ABSTRACT

A powered vehicle is disclosed including a chassis and a plurality of wheels. At least one of the wheels is coupled to the chassis with an axle that is coupled to the chassis with a clip.

18 Claims, 5 Drawing Sheets

US 7,690,668 B2

VEHICLE AXLE MOUNTING

FIELD OF THE INVENTION

The present invention generally relates to vehicles, and more particularly to an axle mounting design for a motorcycle.

BACKGROUND OF THE INVENTION

Motorcycles typically have a chassis, engine, and front and rear wheels. Motorcycles also typically include axles that couple the front and rear wheels to the chassis. Many motorcycles include mufflers that exhaust fumes from the engine toward the rear of the motorcycle.

Depending on the routing of the muffler, it may block access to the axle for the rear wheel. If the access to the axle is blocked, the muffler may need to be removed before the rear wheel can be removed. Having to remove the muffler before removing the rear wheel adds time and inconvenience to removing the rear wheel to change the rear tire, for example.

SUMMARY OF THE INVENTION

According to one aspect of the present invention, a motorized vehicle is provided including a chassis, a plurality of wheels supporting the chassis on the ground, an axle coupling at least one of the wheels to the chassis, and a clip coupling the axle to the chassis.

According to another aspect of the present invention, another motorized vehicle is provided including a chassis, a plurality of wheels supporting the chassis on the ground, an axle coupling at least one of the wheels to the chassis, and a fastener coupled to the axle. At least one of the axle and the fastener includes a groove sized to receive a portion of the other of the axle and the fastener to permit transverse movement of the fastener relative to the axle.

According to another aspect of the invention, a method of removing a wheel from a powered vehicle is provided. The method includes the steps of providing a powered vehicle including a chassis, a plurality of wheels, an axle coupling at least one of the plurality of wheels to the chassis, and a muffler supported by the chassis. The axle has a longitudinal axis extending through a portion of the muffler. The method further includes the step of uncoupling the axle from the chassis with the portion of the muffler supported by the chassis.

According to another aspect of the present invention, a method of removing a wheel from a powered vehicle is provided. The method includes the steps of providing a powered vehicle including a chassis, a plurality of wheels, an axle coupling at least one of the plurality of wheels to the chassis, and a fastener coupling the axle to the chassis. The axle has a longitudinal axis. The method further comprises the step of uncoupling the axle from the chassis by moving the fastener in a direction transverse to the longitudinal axis of the axle.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

A detailed description particularly refers to the accompanying figures in which.

DETAILED DESCRIPTION OF THE DRAWINGS

Figure 1:
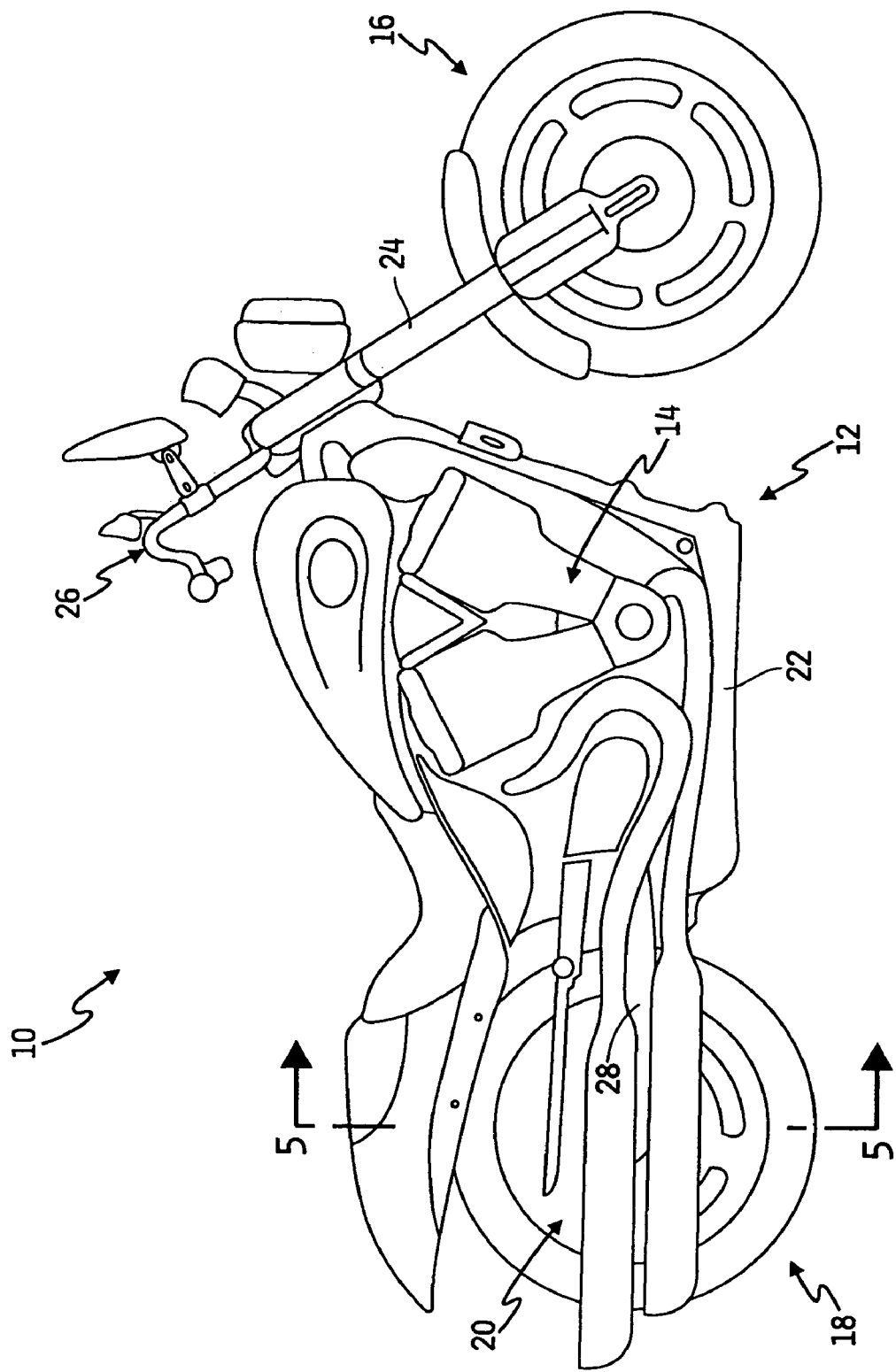
FIG. 1 is a side elevation view of a motorcycle having a chassis, a front wheel, a rear wheel, an engine, and a muffler extending from the engine past the rear wheel.

A motorcycle 10 is shown in FIG. 1 that includes a chassis 12, an engine 14, front and rear wheels 16, 18 that support chassis 12 on the ground, and a muffler 20 extending from engine 14 past rear wheel 18. Chassis 12 includes a main frame 22 supporting engine 14, a front fork 24 coupled to main frame 22 and front wheel 16, handlebars 26 coupled to fork 24, and a rear swingarm 28 coupled to main frame 22 and rear wheel 18. As described in greater detail below, motorcycle 10 is configured to allow installation and/or removal of rear wheel 18 from swingarm 28 without having to remove portions of muffler 20.

Figure 2:
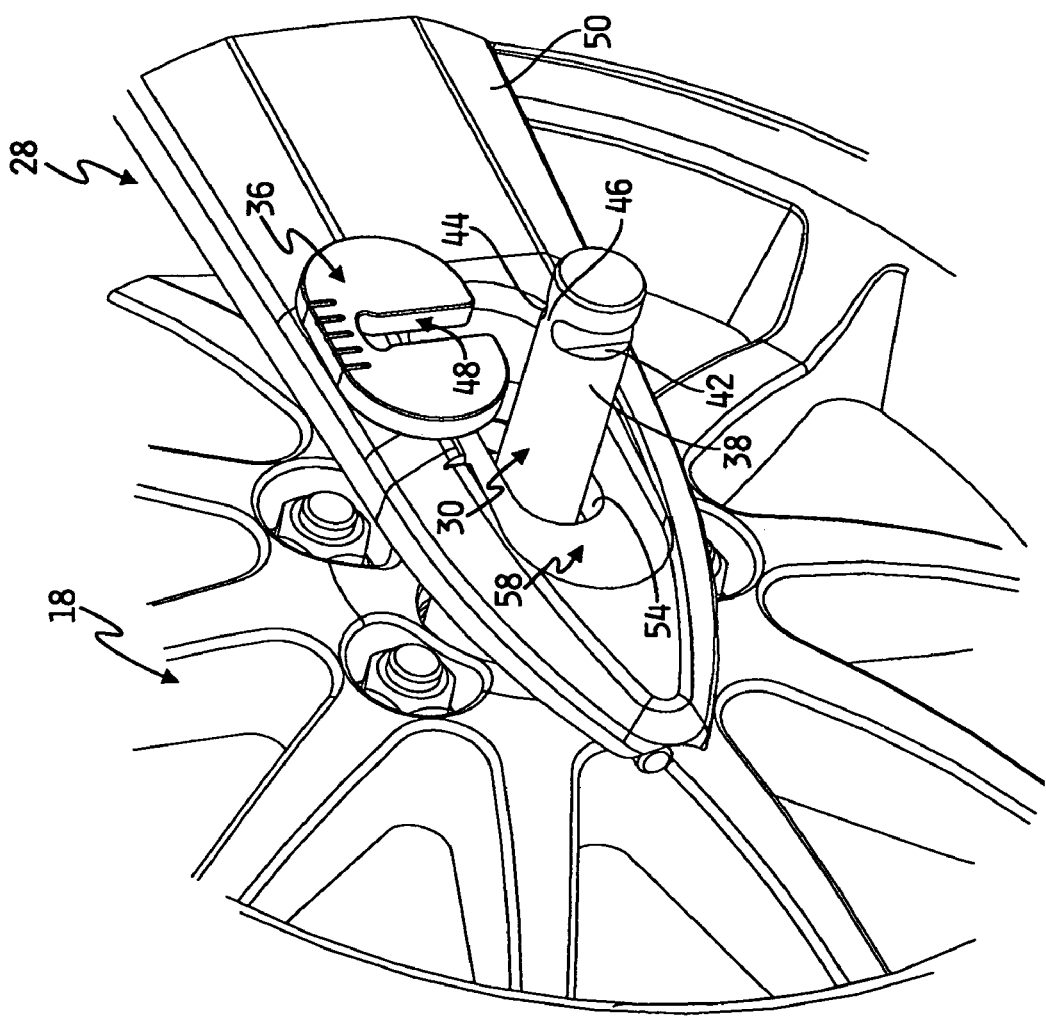
FIG. 2 is a perspective view of a portion of the rear wheel, a right extension of a swingarm of the chassis, an axle, and a fastener or clip positioned to couple the axle to the right extension of the swingarm.
Figure 3:
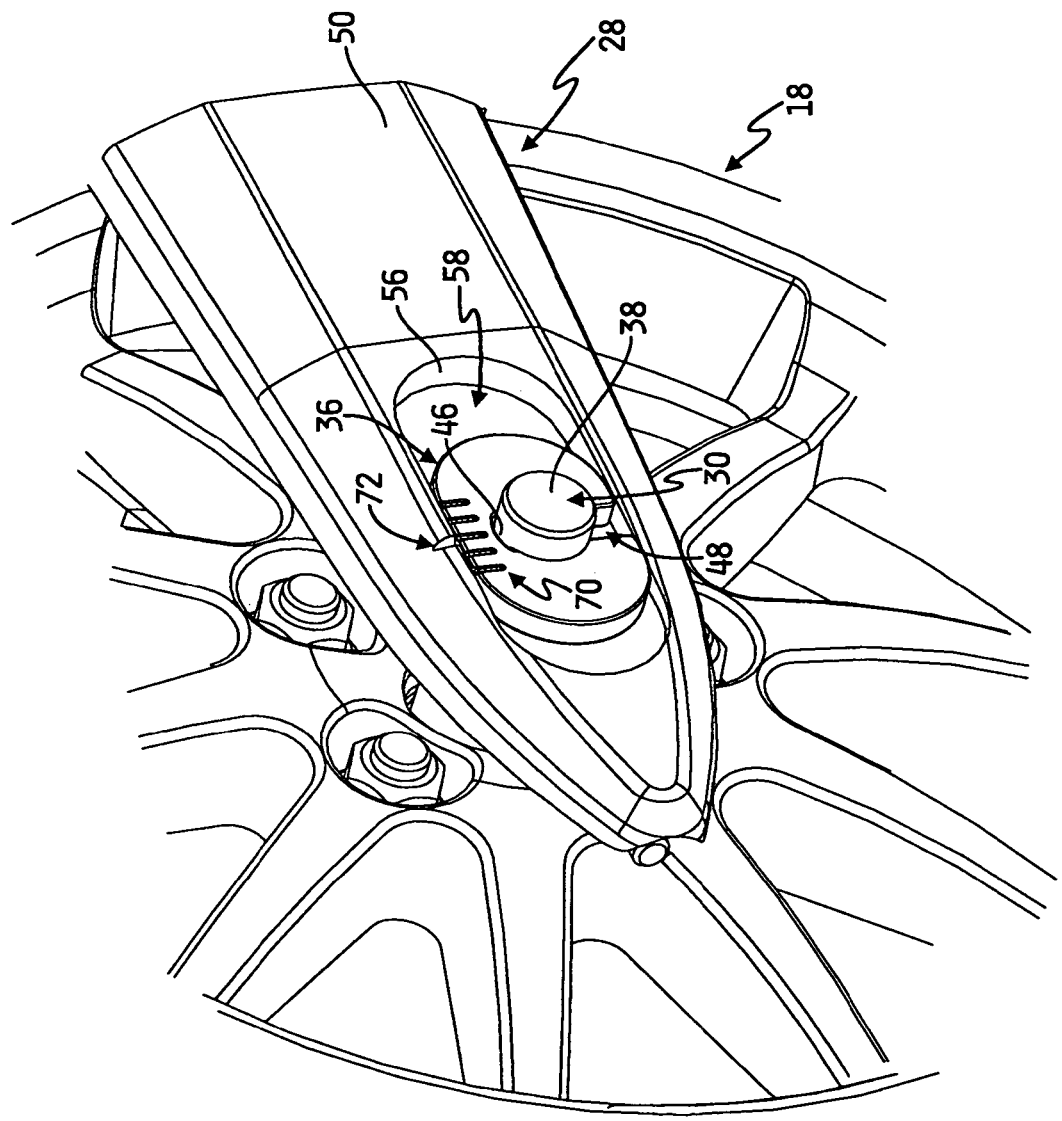
FIG. 3 is a perspective view similar to FIG. 2 showing the clip positioned in a recess formed in the right extension of the swingarm.
Figure 4:
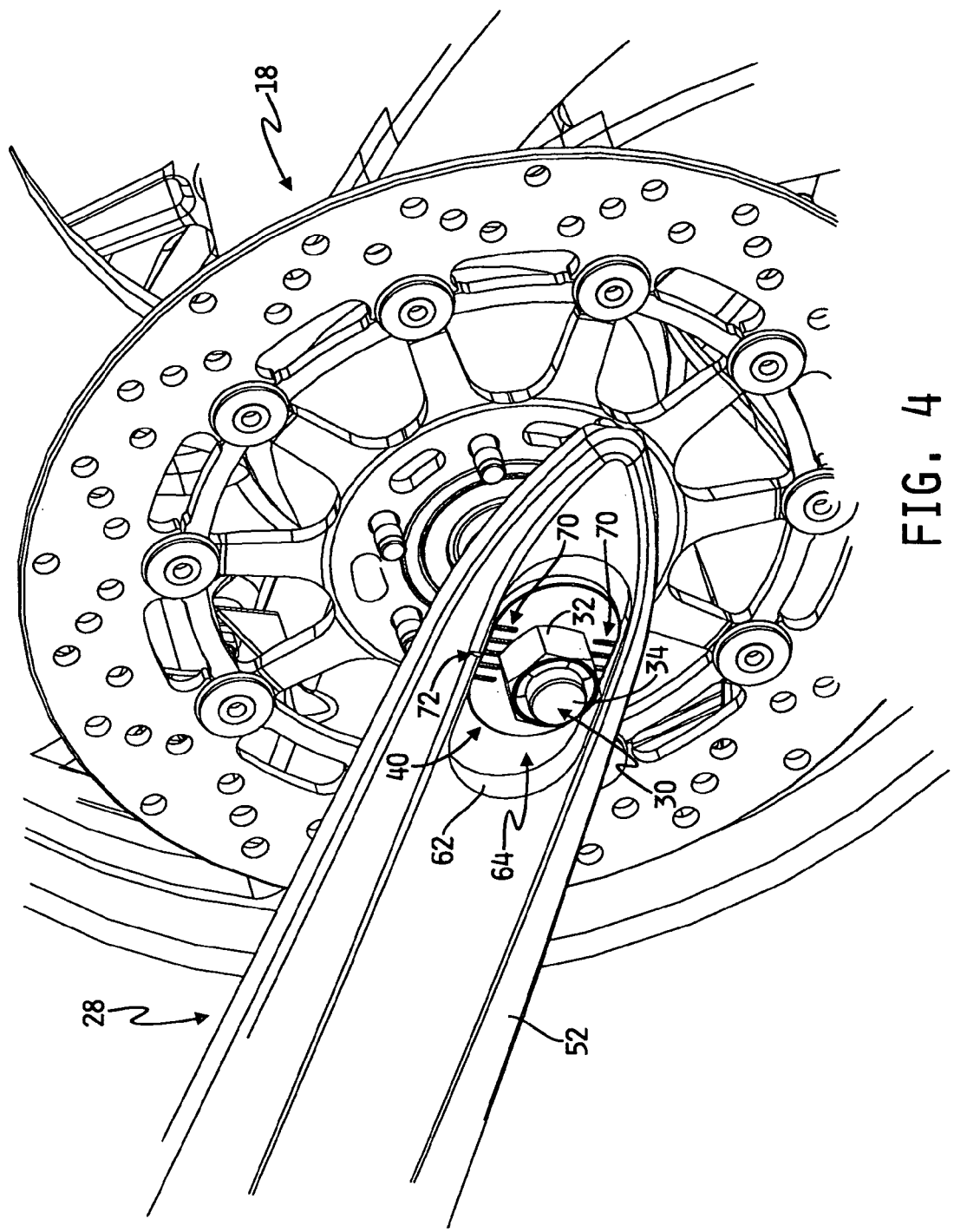
FIG. 4 is a perspective view of another portion of the rear wheel, a left extension of the swingarm of the chassis, the axle, a fastener or nut positioned to couple the axle to the left extension of the swingarm, and an elongated washer positioned in a recess formed in the left extension of the swingarm.
Figure 5:
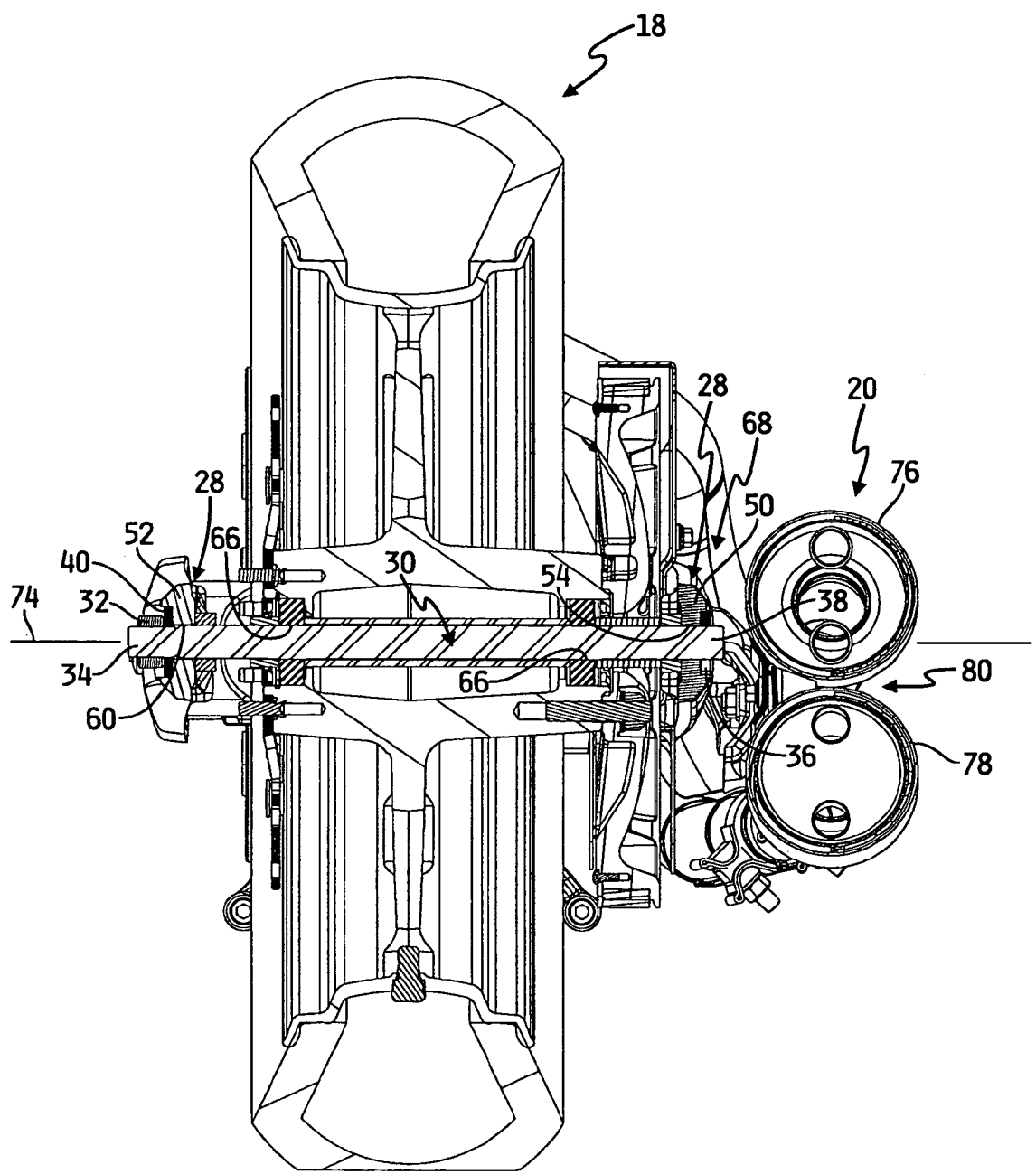
FIG. 5 is a cross-sectional view taken along line 5-5 of FIG. 1.

Referring now to FIGS. 2-5, rear wheel 18 is coupled to swingarm 28 by an axle 30 so that rear wheel 18 can rotate relative to chassis 12 and power movement of motorcycle 10 with power provided by engine 14. Axle 30 is coupled to swingarm 28 with a nut or first fastener 32 coupled to a first end 34 of axle 30 and a C-shaped clip or second fastener 36 coupled to a second end 38 of axle 30. An elongated washer 40 is positioned between nut 32 and swingarm 28 as shown in FIGS. 4 and 5. According to alternative embodiments of the present disclosure, other clips, nuts, and other fasteners are provided to couple axle 30 to chassis 12, such as hairpin clips, standard cotter pins, hairpin cotter pins, snap rings, keys, and other suitable fasteners known to those of ordinary skill in the art.

First end 34 of axle 30 includes a plurality of external threads (not shown) that correspond to internal threads (not shown) provided in nut 32. Second end 38 of axle 30 includes a pair of parallel grooves 42, 44 that receive portions of clip 36 and a web 46 positioned between grooves 42, 44. Grooves 42, 44 preferably include rounded bottoms to reduce stress concentrations. Clip 36 includes a groove 48 that receives web 46 of axle 30 as shown in FIG. 3. Preferably, groove 48 is defined by rounded edges that correspond to the rounded bottoms of grooves 42, 44. As shown in FIG. 2, groove 48 is perpendicular to the length of clip 36. According to alternative embodiments of the present disclosure, the groove of clip 36 may be oriented at other angles, such as parallel to the length of clip 36 or any angle between perpendicular or parallel, such as 45°.

As shown in FIG. 5, swingarm 28 includes a right extension 50 and a left extension 52. Right extension 50 includes an elongated slot 54 and a sidewall 56 that defines an elongated recess 58 that receives clip 36 as shown in FIGS. 2 and 3. Similarly, left extension 52 includes an elongated slot 60 and a sidewall 62 that defines an elongated recess 64 that receives washer 40 as shown in FIG. 4.

To couple rear wheel 18 to chassis 12, rear wheel 18 is positioned between right and left extensions 50, 52 so that a bore 66 of wheel 18 aligns with elongated slots 54, 60 of right and left extensions 50, 52. Second end 38 of axle 30 is inserted through elongated slot 60 of left extension 52, bore 66 of wheel 18, and elongated slot 54 of right extension 52 so that grooves 42, 44 of second end 38 of axle 30 extend slightly past right extension 50. Clip 36 is then inserted through a gap 68 defined between muffler 20 and the remainder of motorcycle 10 as shown in FIG. 5. Clip 36 is then positioned so that web 46 of axle 30 is positioned in groove 48 of clip 36.

Next, washer 40 is positioned over first end 34 of axle 30. Nut 32 is then threaded on first end 34 of axle 30. As nut 32 is threaded on axle 30, clip 36 is drawn into recess 58 of right extension 50 of swingarm 28 as shown in FIG. 3. Similarly, washer 40 is drawn into recess 64 of left extension 52 of swingarm 28 as shown in FIG. 4.

Before nut 32 is tightened to the specified torque, the alignment of rear wheel 18 is verified. As shown in FIGS. 3 and 4, each of clip 36 and washer 40 includes a plurality of alignment markers 70 and right and left extensions 50, 52 of swingarm 28 include corresponding reference markers 72. To align axle 30 and rear wheel 18, reference markers 72 of right and left extensions 50, 52 should align with the same alignment markers 70 on clip 36 and washer 40. If they are not properly aligned, either or both ends 34, 38 of axle 30 are adjusted forward or backwards until reference markers 72 of right and left extensions 50, 52 are positioned equidistant relative to alignment markers 70. Recesses 58 of right extension 50 and recess 64 of left extension 52 are longer than clip 36 and washer 40, respectively, to permit clip 36 and washer 40 to slide in recesses 58, 64 during this adjustment. Similarly, elongated slots 54, 60 of right and left extensions 50, 52 allow axle 30 to slide forward and backward during this adjustment. When properly aligned, nut 32 is tightened on axle 30 so that axle 30 is in tension between right and left extensions 50, 52 of swingarm 28.

When assembled, axle 30 is blocked from rotating relative to chassis 12. With clip 36 positioned in recess 58 of right extension 50, sidewall 56 blocks clip 36 from rotating relative to chassis 12. Similarly, web 46 of axle 30 is keyed into clip 36 so that axle 30 does not rotate relative to clip 36 and chassis 12.

As shown in FIG. 5, axle 30 includes a longitudinal axis 74 that extends through a portion of muffler 20. Muffler 20 includes top and bottom pipes 76, 78 that cooperate to define a gap 80. For the purposes of this disclosure, longitudinal axis 74 is considered to extend through a portion of muffler 20 when it extends through a physical portion of muffler 20, such as top pipe 76 as shown in FIG. 5, or a space defined by muffler 20, such as gap 80. According to alternative embodiments of the present disclosure, the longitudinal axis of the axle does not extend through a portion of the muffler.

During removal of rear wheel 18, no portion of muffler 20 must be detached from motorcycle 10 even though muffler 20 blocks easy access to axle 30. To remove rear wheel 18, nut 32 is backed off first end 34 of axle 30. Once nut 32 is removed, washer 40 can also be removed from recess 64 of left extension 52 of swingarm 28 and axle 30. Axle 30 is then moved slightly to the right so that clip 36 is no longer positioned in recess 58 of right extension 50. Clip 36 can then be slid in a transverse direction relative to axis 74 of axle 30 to uncouple clip 36 from axle 30. According to the embodiment shown in FIGS. 2-4, clip 36 slides in a transverse direction that is 90° relative to axle 30. According to alternative embodiments of the present disclosure, clip 36 can be moved at other transverse directions relative to axle 30, such as 45°, during uncoupling of clip 36 from axle 30. Next, axle 30 is moved to the left out of slot 54 of right extension 50, bore 66 of rear wheel 18, and slot 60 of left extension 52 so that wheel 18 is no longer coupled to chassis 12 and all portions of muffler 20 remain supported by chassis 12. According to alternative embodiments of the present disclosure, portions of the muffler may be removed during removal of the rear wheel.

According to alternative embodiments, the axle mounting configuration of the present disclosure may be provided on vehicles other than motorcycles. For example, the axle mounting configuration of the present disclosure may be provided on other two-wheeled vehicles, such as scooters. The axle mounting configuration of the present disclosure may be provided on vehicles having three or more wheels, such as ATV's and utility vehicles.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A motorized vehicle, comprising:
   a chassis,
   a plurality of wheels supporting the chassis,
   an axle coupling at least one of the wheels to the chassis,
   a clip coupling the axle to the chassis, the clip interengaging with a first end of the axle, with the clip retained to the axle relative to a longitudinal axis of the axle and the clip and axle together being retained to the chassis such that the clip and axle together are not permitted to move in a vertically transverse direction relative to the longitudinal axis, and
   a fastener coupled to a second end of the axle to tension the axle, pulling the clip against the chassis.

2. The motorized vehicle of claim 1, wherein the chassis includes first and second extensions and at least one of the plurality of wheels is positioned between the first and second extensions, and the axle extends through the first and second extensions.

3. The motorized vehicle of claim 2, wherein the first extension is positioned between the clip and the one wheel.

4. The motorized vehicle of claim 3, wherein the second extension is positioned between the fastener and the wheel.

5. The motorized vehicle of claim 1, further comprising a muffler, wherein the clip is positioned between the chassis and the muffler.

6. The motorized vehicle of claim 5, wherein the longitudinal axis of the axle extends through the muffler.

7. The motorized vehicle of claim 1, wherein the chassis includes a recess and the clip is positioned in the recess.

8. The motorized vehicle of claim 1, wherein the chassis includes an elongated slot that is perpendicular to the longitudinal axis of the axle.

9. The motorized vehicle of claim 1, wherein the axle is movable between a plurality of positions relative to the chassis, and at least one of the clip and the chassis includes a plurality of reference markers indicative of a position of the axle relative to the chassis.

10. The motorized vehicle of claim 1, wherein the axle is in tension.

11. A motorized vehicle, comprising:
    a chassis having a recess, a plurality of wheels supporting the chassis,
an axle coupling at least one of the wheels to the chassis, and
a fastener coupled to the axle, the axle comprising at least two grooves that receive the fastener to permit transverse movement of the fastener relative to the axle, the recess receiving the fastener.

12. The motorized vehicle of claim 11, wherein the two grooves are parallel.

13. A motorized vehicle, comprising:
a chassis,
a plurality of wheels supporting the chassis,
an axle coupling at least one of the wheels to the chassis, and
a fastener coupled to the axle, the axle comprising at least two grooves that receive the fastener to permit transverse movement of the fastener relative to the axle, wherein the chassis includes a sidewall that blocks rotation of the fastener.

14. A motorized vehicle comprising:
chassis,
a plurality of wheels supporting the chassis,
an axle coupling at least one of the wheels to the chassis, and
a fastener coupled to the axle, the axle comprising at least two grooves that receive the fastener to permit transverse movement of the fastener relative to the axle, and a muffler, the axle includes a longitudinal axis that extends through the muffler, and the fastener is positioned between the chassis and the muffler.

15. A motorized vehicle frame, comprising:
a chassis, comprising extensions, at least one of the extensions comprising a recess;
an axle for coupling to the chassis, and for receipt between the extensions in a first direction; and
a fastener coupled to the axle, at least one of the axle and the fastener including at least one groove sized to receive a portion of the other of the axle and the fastener to permit transverse movement of the fastener relative to the first direction, and the fastener being profiled for receipt in the recess.

16. The motorized vehicle frame of claim 15, wherein the axle includes grooves and the fastener is in the form of a slotted clip receivable in the grooves.

17. The motorized vehicle frame of claim 16, wherein the axle is movable between a plurality of positions relative to the chassis, and at least one of the clip and the chassis includes a plurality of reference markers indicative of a position of the axle relative to the chassis.

18. The motorized vehicle frame of claim 17, wherein the extensions are spaced apart and profiled to receive a wheel therebetween.

* * * * *

UNITED STATES PATENT AND TRADEMARK OFFICE
CERTIFICATE OF CORRECTION

PATENT NO. : 7,690,668 B2  Page 1 of 1
APPLICATION NO. : 11/085754
DATED : April 6, 2010
INVENTOR(S) : James A. J. Holroyd It is certified that error appears in the above-identified patent and that said Letters Patent is hereby corrected as shown below:

Title page, item [75] inventor's name, insert --J-- between "A" and "Holroyd".

In column 5, line 21, insert the word --a-- before "chassis".

Signed and Sealed this

Sixth Day of July, 2010

David J. Kappos
*Director of the United States Patent and Trademark Office*